United States Patent
Schwery et al.

(10) Patent No.: US 8,674,566 B2
(45) Date of Patent: Mar. 18, 2014

(54) ELECTRICAL MACHINE WITH A DEVICE FOR MONITORING AN AIR GAP BETWEEN A ROTOR AND A STATOR

(75) Inventors: Alexander Schwery, Kuettingen (CH); Serdar Cifyildiz, Winterthur (CH); Matthias Schmid, Birmenstorf (CH)

(73) Assignee: Alstom Renewable Technologies, Grenoble (FR)

( * ) Notice: Subject to any disclaimer, the term of this patent is extended or adjusted under 35 U.S.C. 154(b) by 33 days.

(21) Appl. No.: 13/276,337

(22) Filed: Oct. 19, 2011

(65) Prior Publication Data

US 2012/0119628 A1 May 17, 2012

Related U.S. Application Data

(63) Continuation of application No. PCT/EP2010/055132, filed on Apr. 19, 2010.

(30) Foreign Application Priority Data

Apr. 24, 2009 (DE) .......................... 10 2009 018 553
Aug. 20, 2009 (DE) .......................... 10 2009 037 990

(51) Int. Cl.
*H02K 23/66* (2006.01)
*H02K 23/40* (2006.01)
*G01R 31/06* (2006.01)
*G08B 21/00* (2006.01)

(52) U.S. Cl.
USPC ...... 310/68 B; 310/40 R; 324/546; 340/686.4

(58) Field of Classification Search
USPC ............. 310/40 R, 68 B; 324/546; 340/686.4
See application file for complete search history.

(56) References Cited

U.S. PATENT DOCUMENTS

4,704,906 A * 11/1987 Churchill et al. ............... 73/660
5,252,927 A 10/1993 Bruhlmeier et al.
2007/0290873 A1 12/2007 Jensen

FOREIGN PATENT DOCUMENTS

| CA | 2379150 A1 | 1/2001 |
| CH | 486149 A | 2/1970 |
| DE | 19932911 A1 | 1/2001 |
| EP | 1870987 A1 | 12/2007 |
| JP | 59191451 A * | 10/1984 |
| JP | 60152250 A | 8/1985 |

(Continued)

OTHER PUBLICATIONS

European Patent Office, International Search Report in International Patent Application No. PCT/EP2010/055132 (Oct. 10, 2010).

(Continued)

*Primary Examiner* — Tran Nguyen
*Assistant Examiner* — Jose Gonzalez Quinones
(74) *Attorney, Agent, or Firm* — Buchanan Ingersoll & Rooney PC

(57) ABSTRACT

An electrical machine configured to operate at a power range of several MVA includes a rotor is configured to rotate about a rotor axis. The rotor includes a rotor lamination stack. A stator includes a stator lamination stack concentrically surrounding the rotor lamination stack, wherein a ring-like air gap separates the rotor lamination stack from the stator. An air gap monitoring device extends through the air gap in an axial direction and is configured to detect at least one of a change in a rotor geometry and a presence of debris in the air gap.

6 Claims, 3 Drawing Sheets

(56) References Cited

FOREIGN PATENT DOCUMENTS

| | | | | |
|---|---|---|---|---|
| JP | 01299403 | A | * | 12/1989 |
| JP | 04273074 | A | * | 9/1992 |
| JP | 10327560 | A | * | 12/1998 |

OTHER PUBLICATIONS

German Patent & Trademark Office, Search Report in German Patent Application DE 10 2009 037 990 (May 4, 2010).

* cited by examiner

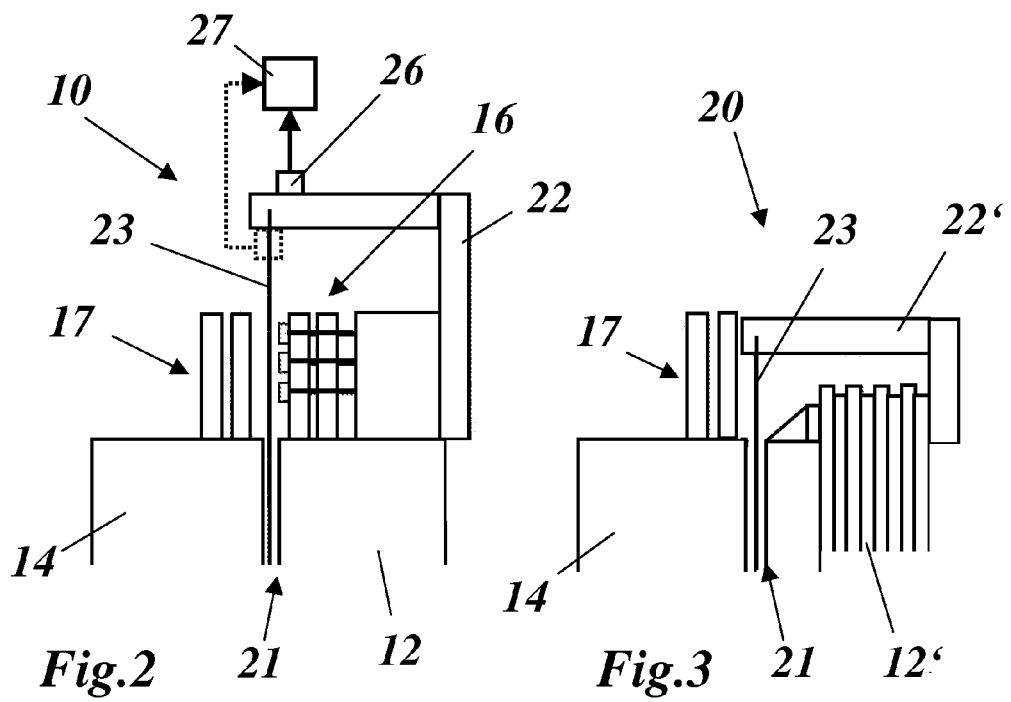
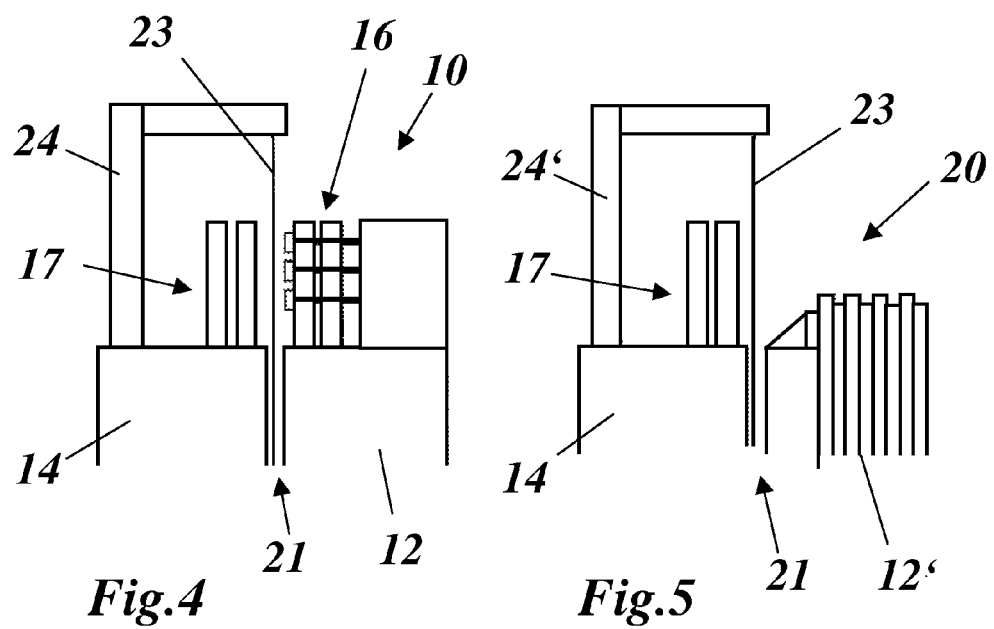

ELECTRICAL MACHINE WITH A DEVICE FOR MONITORING AN AIR GAP BETWEEN A ROTOR AND A STATOR

CROSS REFERENCE TO PRIOR APPLICATIONS

This application is a continuation of International Patent Application No. PCT/EP2010/055132, filed on Apr. 19, 2010, which claims priority to German Patent Application Nos. DE 10 2009 018 553.4, filed on Apr. 24, 2009, and DE 10 2009 037 990.8, filed on Aug. 20, 2009. The entire disclosure of each application is hereby incorporated by reference herein.

FIELD

The present invention relates to the field of electrical machines.

BACKGROUND

Double-fed asynchronous machines in the power range from 20 MVA to 500 MVA can be used for variable-speed energy production. These machines are distinguished by a distributed three-phase winding on the rotor. The rotor winding consists of individual bars which are embedded in slots in the rotor laminations. The individual bars are connected in the winding head to form a winding. The arrangement of the bar connections is uniformly distributed around the circumference. As a result of the rotation of the rotor, the winding heads are subjected to centrifugal forces, against which they have to be mechanically secured by means of winding head retention systems. In principle, three types of winding head retention systems can be used:
1. Fixing by means of a steel cap, as is the case with turbo-generators.
2. Fixing wherein a steel cable, wire or plastic film is wrapped around the whole winding head.
3. Fixing by means of bolts, screws or U-shaped brackets.

Such an asynchronous machine 10 is reproduced in section in highly simplified form in FIG. 1. It comprises a rotor 19 which can be rotated about an axis 18 and is encompassed concentrically by a stator with a stator lamination stack 14 with corresponding stator winding and a stator winding head 17. The rotor 19 comprises a central body 11 which merges with a shaft 11' at each end. The central body 11 is surrounded by a rotor lamination stack 12 in which the rotor winding 13 runs. Slip rings 15, which are used to supply the rotor winding 13 with current, are arranged on one of the shafts 11'. A cylindrical air gap 21, which extends through the machine in the axial direction, is provided between the rotor lamination stack 12 and the stator lamination stack 14.

The air gap can have a different geometry in different operating phases depending on temperature, speed and other variable parameters. These changes do not substantially affect the function of the machine. However, it is also possible for the geometry of the rotor to permanently change in an intolerable manner or for debris to get into the air gap. In order to prevent consequential functional faults and to subject the machine to an inspection as soon as possible, it is necessary to detect changes of this kind in the air gap in good time.

SUMMARY OF THE INVENTION

In an embodiment, the present invention provides an electrical machine configured to operate at a power range of several MVA. A rotor is configured to rotate about a rotor axis and includes a rotor lamination stack. A stator includes a stator lamination stack concentrically surrounding the rotor lamination stack, wherein a ring-like air gap separates the rotor lamination stack from the stator. An air gap monitoring device extends through the air gap in an axial direction and is configured to detect at least one of a change in a rotor geometry and a presence of debris in the air gap.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 2 shows an asynchronous machine according to FIG. 1 with a monitoring track fixed on the rotor side according to a first exemplary embodiment of the invention;

FIG. 3 shows in a comparable arrangement to FIG. 2 a synchronous machine with a monitoring track fixed on the rotor side according to a second exemplary embodiment of the invention;

FIG. 4 shows an asynchronous machine according to FIG. 1 with a monitoring track fixed on the stator side according to a third exemplary embodiment of the invention;

FIG. 5 shows in a comparable arrangement to FIG. 4 a synchronous machine with a monitoring track fixed on the stator side according to a fourth exemplary embodiment of the invention.

DETAILED DESCRIPTION

An embodiment of the invention provides an electrical machine such that critical changes in the geometry of the air gap are detected in good time.

In an embodiment according to the invention, means are provided for monitoring the air gap which extend through the air gap in the axial direction and with which a change in the rotor geometry and/or the presence of debris in the air gap can be detected.

An embodiment of the invention is characterized in that the monitoring means comprise a monitoring track which extends through the air gap in the axial direction.

Preferably, the monitoring track runs parallel to the axis.

According to an embodiment, the monitoring track is formed by at least one taut wire.

In particular, means are provided for monitoring the mechanical strain in the wire.

According to another embodiment, the monitoring track is formed by at least one light beam. In particular, means are provided for monitoring the integrity of the light beam.

In order to achieve a better resolution, it can be of advantage here when a plurality of parallel light beams distributed over the thickness of the air gap form the monitoring track.

In an embodiment, the at least one wire can be fixed to the rotor by means of suspension means.

In an embodiment, the at least one wire can also be fixed to the stator by means of suspension means.

In a corresponding manner, the at least one light beam can be connected to the rotor and fixed to rotate therewith.

In an embodiment, the at least one light beam can also be designed to be stationary.

In an embodiment of the present invention, at an early stage, the presence of debris in the air gap or a change in the rotor geometry can be detected with the help of a monitoring track in the form of a taut wire or in the form of optical means (laser). The signal generated by the associated monitoring device can be used for protection purposes or only for monitoring purposes. At the same time, differentiation can be made between a system which is mounted on the rotor and fixed to rotate therewith and is used to monitor the stator, and a system fixed to the stator, which is used to monitor the rotor. However, not only can such a system be used with advantage in asynchronous machines, but also in conventional synchronous machines.

Figure 1:
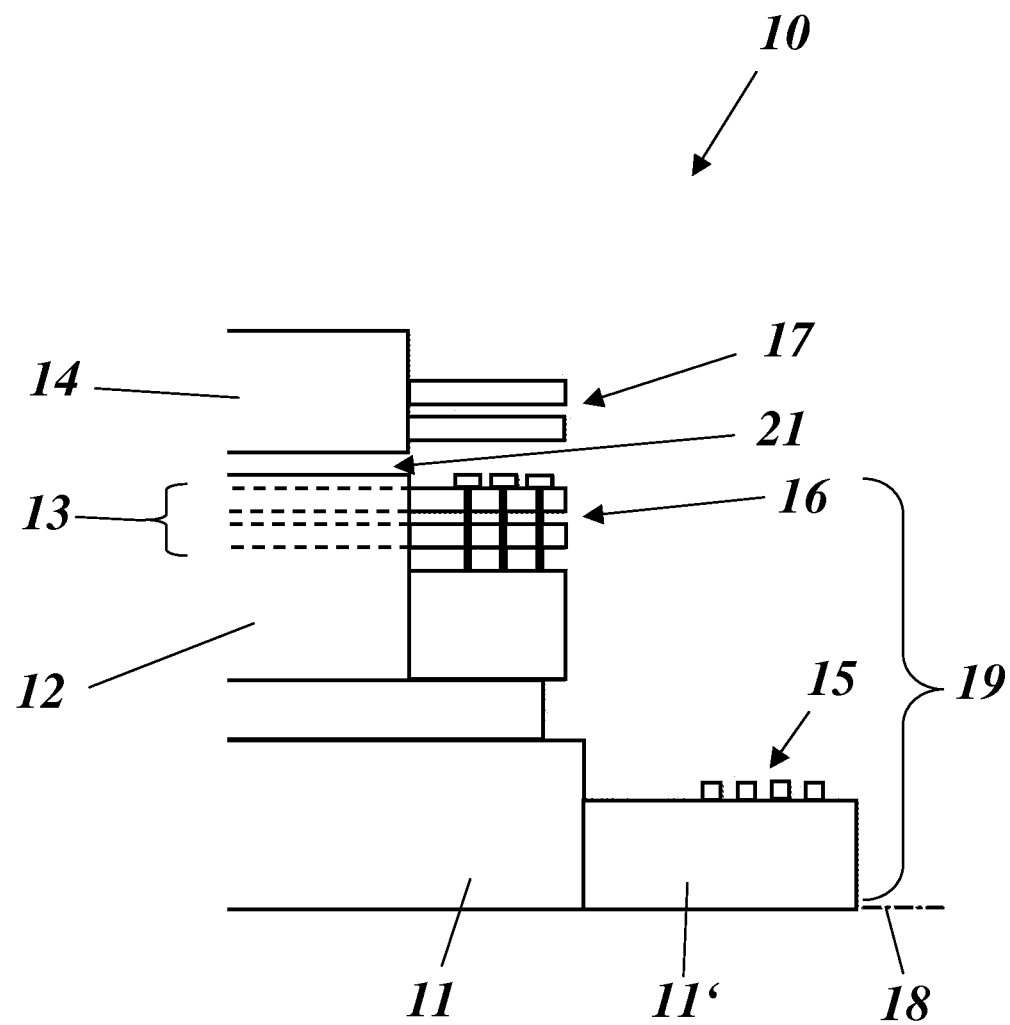
FIG. 1 shows in a simplified representation a section of an asynchronous machine with stator and rotor winding and an air gap between rotor and stator according to the prior art.

FIGS. 2 and 3 show a first exemplary embodiment of a monitoring system according to the invention for an asynchronous machine according to FIG. 1 (FIG. 2) and for a synchronous machine (FIG. 3), wherein here, in contrast to FIG. 1, the machine axis is shown in a vertical orientation. In both cases, a monitoring track 23 is fed parallel to the axis through the air gap 21 between rotor lamination stack 12 and stator lamination stack 14. As already mentioned, the monitoring track 23 can be formed by a wire under mechanical strain or by a light beam which runs between an appropriate optical transmitter and receiver and which is weakened or completely interrupted when debris or geometrical changes in the air gap affect the light beam.

The exemplary embodiment of FIG. 2 starts from a monitoring track 23 in the form of a wire. A wire made from a suitable material (Perlon, Kevlar, aluminum etc.) is mounted on the rotor 12 with the help of suspension means 22 so that it runs in the air gap 21 parallel to the machine axis 18. In doing so, the mountings can be fixed to the rotor rim or attached directly to the pole end plates. The mechanical stress in the wire is monitored. For this purpose, a strain sensor 26 which measures the mechanical strain in the wire and outputs appropriate signals to a processing unit 27 is arranged on the suspension means 22 or on the wire itself (shown dotted).

FIG. 3 shows an analogous arrangement for a synchronous machine 20 with a stator lamination stack 12' and suspension means 22'. The monitoring means 26, 27 are omitted here for the sake of simplicity.

Here too, an optical system, such as a laser and an appropriate receptor, can be used instead of the wire. The optical system behaves like a light barrier.

If parts of the stator come loose (for example ventilation plate spacers) or if the geometry of the stator changes significantly, contact is made with the wire rotating with the rotor, or the light barrier rotating with the rotor is interrupted.

Two other exemplary embodiments, which correspond to those in FIGS. 2 and 3, are shown in FIGS. 4 and 5. In this case, the wire or light barrier (monitoring track 23) is fixed to the stator. In doing so, the suspension means 24 and 24' respectively required for this can be mounted directly on the spring fingers, on the air cowlings or on the stator housing. The principle of operation corresponds to that of the monitoring fixed to the rotor in FIGS. 2 and 3. If parts on the rotor come loose or if the geometry of the rotor changes significantly, contact is made with the wire, or the light barrier is interrupted.

With synchronous machines 20 (FIG. 5), the monitoring system described can detect a change in rotor geometry such as a change in the radial position of a pole, an unequal expansion of the rotor rim and also deformations of the pole connections of the excitation and damping winding.

With the double-fed asynchronous machine (FIG. 4), as well as the roundness of the rotor lamination stack, particularly the retaining device for the winding head can be monitored.

Figure 6:
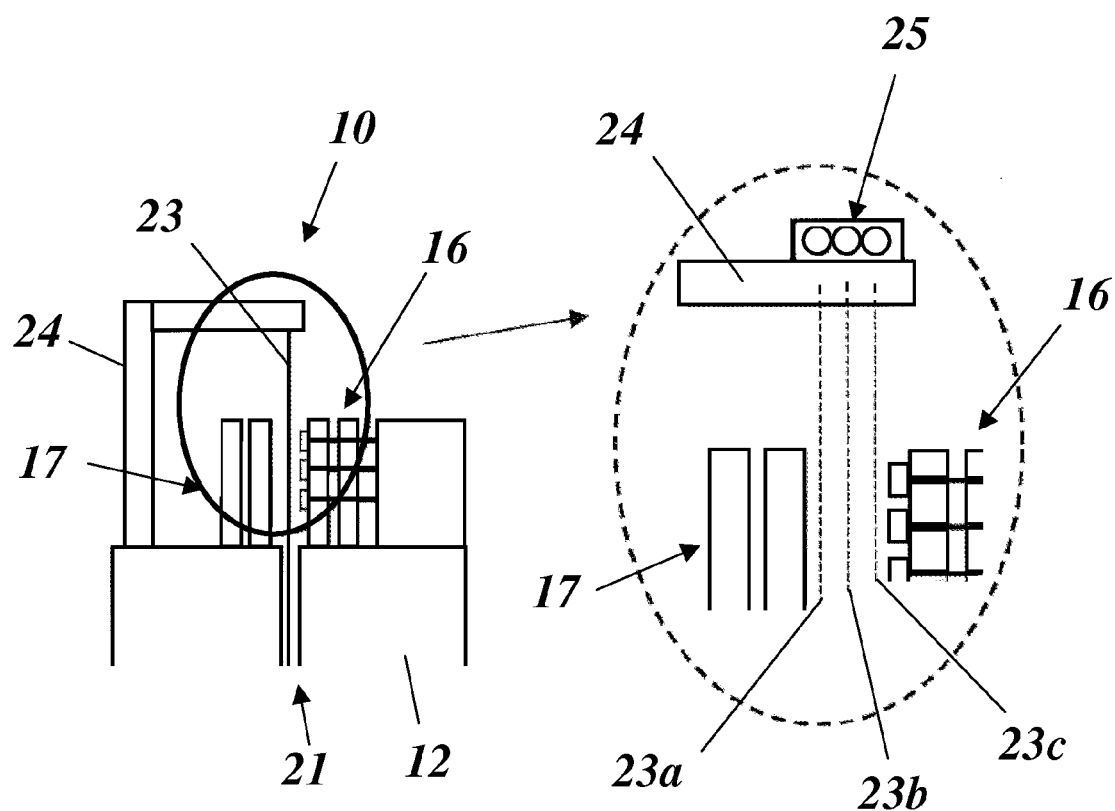
FIG. 6 shows in a comparable arrangement to FIG. 4 an asynchronous machine with an optical monitoring track with higher spatial resolution fixed on the stator side and formed by a plurality of light beams.

In all the cases described, according to FIG. 6 it is possible to replace the beam-shaped light barrier by a plurality of parallel-running light beams 23a, 23b and 23c with an appropriate optical transmitter/receiver 25. In this case, the change in air gap geometry and/or the unwanted presence of bodies can be detected in steps. This can be used in a first step, for example, to only trigger an alarm, and—if the situation deteriorates—to stop the machine in an emergency. If the signals of the system fixed to the stator according to FIG. 6 are synchronized with the signal of a keyphasor, the evaluation of the data allows the radial position of each individual pole to be measured. The expansion of the rotor under different operating conditions can also be monitored (no-load, full-load . . . ).

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

LIST OF REFERENCE NUMERALS 10 electrical machine (asynchronous machine)
11 central body
11' shaft
12,12' rotor lamination stack
13 rotor winding
14 stator lamination stack
15 slip ring
16 rotor winding head
17 stator winding head
18 axis
19 rotor
20 electrical machine (synchronous machine)
21 air gap
22,22' suspension means (rotor side)
23 monitoring track (wire, light beam)
23a,b,c light beam
24,24' suspension means (stator side)
25 optical transmitter/receiver
26 strain sensor
27 processing unit

The invention claimed is:

1. An electrical machine configured to operate at a power range of several MVA comprising:
   a rotor configured to rotate about a rotor axis and including a rotor lamination stack;
   a stator including a stator lamination stack concentrically surrounding the rotor lamination stack, wherein a ring-like air gap separates the rotor lamination stack from the stator; and
   an air gap monitoring device extending through the air gap in an axial direction and configured to detect at least one of a change in a rotor geometry and a presence of debris in the air gap, the air gap monitoring device including a monitoring track that extends through the air gap in the axial direction and that includes at least one taut wire.

2. The electrical machine as recited in claim 1, wherein the electrical machine is one of an asynchronous machine and a synchronous machine.

3. The electrical machine as recited in claim 1, wherein the monitoring track extends parallel to the rotor axis.

4. The electrical machine as recited in claim 1, further comprising a suspension device configured to fix the at least one wire to the stator.

5. The electrical machine as recited in claim 1, further comprising a suspension device configured to fix the at least one wire to the rotor.

6. The electrical machine as recited in claim 1, further comprising a strain monitoring device configured to monitor a mechanical strain in the wire.

\* \* \* \* \*